United States Patent [19]

Klabunde

[11] 4,189,412
[45] Feb. 19, 1980

[54] SEALANT COMPOSITION

[75] Inventor: Edwin C. Klabunde, Sparks, Nev.

[73] Assignee: Superior Products Company, Inc., Sparks, Nev.

[21] Appl. No.: 952,123

[22] Filed: Oct. 17, 1978

[51] Int. Cl.$^2$ ............................................. C08C 91/00
[52] U.S. Cl. ........................ 260/28.5 AS; 260/28.5 D; 428/411
[58] Field of Search ................... 260/28.5 D, 28.5 AS

[56] References Cited

U.S. PATENT DOCUMENTS

| Re. 29,548 | 2/1978 | Payne et al. | 260/28.5 D |
| 2,715,615 | 8/1955 | DeBell et al. | 260/28.5 D |

*Primary Examiner*—Melvyn I. Marquis
*Attorney, Agent, or Firm*—Warren, Chickering & Grunewald

[57] ABSTRACT

A sealant composition particularly for use in joints between adjacent concrete slabs and deck membranes which includes coal tar pitch, vinyl chloride polymer, a solid, particulate filler and an additive mixture of a blend of petroleum-based aromatic distillates boiling from about 220° C. to about 650° C.

1 Claim, No Drawings

SEALANT COMPOSITION

BACKGROUND OF THE INVENTION

For many years tars and pitches have been used to fill the joints and cracks between adjacent concrete slabs which are used as highway and airfield pavements and to form films or waterproofing membranes on concrete slabs. Tars and pitches, in their native form, have many unsatisfactory characteristics for this use. For example, tars and pitches, in their native form, get very brittle in cold weather and tend to crack and lose the bond between the tar or pitch and the concrete slab. As a result, water penetrates the joint and freezing and thawing cycles causes the slabs to break up. In very warm weather tars and pitches become soft and tacky which, in turn, causes them to be extruded from the sides of a crack when exposed to traffic and causes tar to stick to vehicle wheels causing a problem known as tracking in which the tar or pitch is removed from the crack by adhering to vehicle wheels and to spread over the surface of pavement by contact between the wheel surface and the pavement.

Native tars and pitches are particularly vulnerable when used in airfield concrete pavements for modern airports because they are soluble in jet fuel and because they liquefy in the heat of a jet engine blast.

Many of the above-mentioned problems have been solved by the advent of blends of coal tar pitch and vinyl chloride polymers, hereinafter PVC. Blends of coal tar pitch and PVC form a rubber-like gel that remains flexible in cold weather and rubber-like in hot weather. The PVC-coal tar pitch mixture exhibits good adhesion to concrete and good cohesion so that the joint between adjacent slabs remains sealed against moisture penetration. In addition, the PVC-coal tar pitch gel withstands the heat of a jet engine blast and is not soluble in jet fuel. Generally, the coal tar pitch-PVC composition includes solid particulate fillers such as clays and these fillers both occupy volume and contribute to the texture and function of the composition. In addition, the blends include a plasticizer which is usually a nonvolatile liquid that is incorporated in the structure of the final material in such a manner that it will prevent the final composition from becoming too brittle. Plasticizers for use in PVC-coal tar pitch compositions typically are octylphthalates.

It is currently thought the PVC-coal tar pitch blends obtain their desirable properties by a physical relationship between the components. PVC is normally added to coal tar pitch in the form of a particulate solid. Since coal tar pitch is normally a solid at room temperature, it is necessary to heat the coal tar pitch to make it liquid phase so that the PVC and other components of a mixture can be blended into it. The hot coal tar pitch causes the PVC to dissolve and upon cooling the PVC forms a molecular network within the coal tar pitch to produce the rubbery product that has been found desirable as a sealant.

It has been found desirable and almost essential that the blend of ingredients used in a joint sealant be made at the factory rather than in the field on the site of where the materials are to be used. Sophisticated measuring and blending techniques are essential to have the materials in the right proportion and in the right condition for being applied to a joint, for example, in an airport runway. As a result, manufacturers generally compound the entire blend and then place it in containers to be shipped to the site of application. At the site of application, the material is removed from the container and placed in a heated vessel and when it is hot enough to have good consistency for pouring, it is poured from the vessel into a joint between adjacent concrete slabs. When it cools in the joint the composition obtains its desirable rubbery, adhesive, cohesive properties and forms an effective seal for many years.

Although the solution of PVC and the formation of the network-like structure is a physical reaction, PVC-coal tar pitch mixtures also react chemically with each other to form a thermosetting, cross-linked compound which is not a good joint sealant composition but it is primarily undesirable because it causes the joint sealant composition to set up in the heating vessel. This cross-linking reaction is promoted by high temperatures. Accordingly, a PVC-coal tar pitch mixture has a limited high temperature life and it is essential that exposure of such mixtures to high temperatures be limited in the manufacturing process to give maximum "pot life" in the field where it is being applied.

It is known from U.S. Pat. No. 3,549,575 and its reissue U.S. Pat. No. Re. 29,548 that in compounding joint sealant compositions a liquid phase can be maintained at room temperature by using a particular boiling range pitch which exhibits an anomoly in that it is liquid at room temperature even though higher and lower boiling pitches are solid at room temperature. This pitch identified as D pitch in the patent is from coal tar and it boils between 355° and 450° C. at atmospheric pressure. The liquid nature of D pitch permits blending PVC particles into it at low enough temperature to prevent PVC from dissolving. The boiling range of D pitch also is high enough to exclude almost all naphtalene compounds from its composition which is necessary because naphthalenes cause PVC to dissolve and would result in gelling of the composition in its shipping container.

Although D pitch is liquid at or slightly above room temperature, it is a viscous liquid and it is desirably made more fluid by blending it with a compatible, less viscous liquid. As stated above, this has been done in the past by blending D pitch with an octylphthalate, for example, dibutyl phthalate. The phthalates not only make the pitch more fluid but have the desirable aftereffect of being a plasticizer for the final product. Unfortunately, octylphthalates are very expensive and constitute a significant portion of the total cost of the joint sealant.

Having a very fluid pitch before it gels is very important not only from the point of view of being easy to use but also from the point of view of the character of the final product. Pitch that is liquid in the container is very readily poured into a heating vessel at the site of application, it has a long "pot life" because no cross-linking reactions have yet been effected, and if it is very fluid liquid it readily fills joints between adjacent concrete slabs without causing bubbles to be trapped within the sealant composition so that the final seal between the joints of concrete slabs is complete and without bubbles or blisters. The composition of this invention not only avoids the formation of bubbles and blisters when it is applied to a joint, but it additionally has been found to resist blister formation upon long exposure to heat and ultraviolet radiation.

SUMMARY OF THE INVENTION

This invention provides a novel joint sealant that does not contain expensive plasticizers such as octylphthalates, does not contain harmful naphthalenes, includes far less of the expensive coal tar pitch and has improved qualities of shelf life, ease of application, cohesion, adhesion, resilience and workability which prevents bubbles and blisters in the installed product. The composition of this invention includes coal tar pitch, PVC, solid particulate filler, and an additive blend made up of at least three petroleum-based aromatic tars and oils which provide the proper proportion of aromatic compounds in each boiling range to make the fluid composition resilient, adhesive, cohesive, fluid at room temperature so that it can be put together with long shelf life and long pot time and highly fluid at application temperature to avoid bubbles and blisters in the final product. The composition of this invention includes, on a weight basis, the following:

| Coal tar pitch (D pitch) | 40%-85% |
|---|---|
| PVC | 2%-25% |
| Solid particulate filler | 2%-25% |
| Additive blend | 5%-55% |

The preferred composition contains about 60% coal tar pitch, about 10% PVC, about 17% filler and the balance additive blend.

The additive blend is a mixture of aromatic petroleum-based distillates. On a weight basis, the mixture contains from 15% to 30% of an aromatic petroleum-based distillate boiling from about 260° C. to about 535° C., from 15% to 30% of an aromatic petroleum-based distillate boiling from 220° C. to 650° C. and from 40% to 70% of an aromatic petroleum based distillate boiling from 285° C. to 395° C. Although these additive components all are aromatic petroleum-based distillates, it has been found that emphasizing some boiling ranges as opposed to others has a definite and significant effect on the properties of the final composition. The aromatic petroleum-based distillate boiling from 260° C.-535° C. contributes aromatic hydrocarbon to the additive blend that improves the bonding characteristics of the final product. Bonding includes both adhesion of the sealant to the concrete it is being used with and cohesion of the sealant to itself. The additive blend of this invention produces a final product that will not crack but will maintain its rubbery characteristics and in addition it will adhere tenaciously to concrete through indefinite cycles of thermal expansion and thermal contraction.

The petroleum-based distillate boiling from 220° C. to 650° C. has a significant effect upon the resilience of the final product. An additive blend made without this boiling range will not have the rubbery characteristics that are so desirable in sealant compositions and compositions made without this particular boiling range material will tend to have deformations become set rather than to have the highly elastic and resilient quality that is desirable in such compositions.

The portion of the additive blend boiling between 285° C. and 395° C. has a definite and significant effect upon how fluid the composition of this invention is when it is being made in the factory and when it is being heated and applied at the site of application as well as having a significant effect upon the plastic character of the final composition after it is applied. This boiling range petroleum-based distillate is a plasticizer and fluidizer that allows the composition of this invention to be composited at low temperatures thereby avoiding dissolution of PVC so that the composition has long shelf life in the shipping container without gelling and long "pot time" in the field without cross-linking reactions taking place. This portion of the additive blend also contributes a plasticizing quality to the final product.

DETAILED DESCRIPTION OF THE INVENTION

A batch of joint sealant composition constituting 42,100 pounds of the composition was prepared. The batch had the following composition:

| INGREDIENT | WEIGHT IN POUNDS |
|---|---|
| D Pitch | 25,260 |
| PVC | 4,210 |
| Clay | 7,157 |
| Additive Blend | 5,473 |
| ADDITIVE BLEND COMPOSITION | |
| BOILING RANGE | WEIGHT IN POUNDS |
| 285° C.-535° C. | 1,204 |
| 220° C.-650° C. | 1,204 |
| 285° C.-395° C. | 3,065 |

The composition is prepared by introducing all of the D pitch into a blending vessel at high enough temperature to be easily pumped and mixed. A temperature of 50° C. is adequate. The additive blend is next added to the D pitch and the pitch and additive blend are thoroughly mixed to form a uniform fluid mixture. Next the PVC and clay are added and as soon as a uniform mixture is formed the material is removed from the blending vessel and placed in shipping containers. The material may be maintained for long periods in the shipping containers and it will still be a pourable liquid that is readily useable in the field. The pourable liquid in the shipping containers can be heated quickly and uniformly in the field because it is all liquid phase and will provide long pot time.

As compared with a product known to the art made with dibutyl phthalate as a plasticizer and fluidizer, the above-described product has the following advantages. First, the coal tar pitch content of the blend is reduced by about 17%. Coal tar pitch is quite expensive compared with the aromatic petroleum distillates and, accordingly, the product of the present invention is less expensive than the prior art compositions.

The composition of the present invention includes no octylphthalates. Octylphthalates are relatively pure chemicals and are inherently more expensive than petroleum-based distillates. Accordingly, the product of the present invention is inherently less expensive than equivalent prior art compositions. Reducing the content of coal tar pitch and octylphthalates at current market costs reduces the cost of the composition of the present invention by a factor of about 35% over prior art compositions.

The composition of the present invention is more fluid which greatly improves the ability to blend the ingredients that make it up and greatly improves its workability in the field. The highly fluid character of the product, for all practical purposes, eliminates bubbling problems in the field and eliminates blistering of the product after it is formed in a crack between concrete slabs.

As compared with equivalent prior art compositions made with octylphthalates, the product of the present invention has increased resilience by approximately 25%. In addition, the product of the present invention has bonding properties that are superior in that adhesion and cohesion are both increased.

What is claimed is:

1. A composition consisting essentially of:
   A. from about 40% to about 85% of a coal tar pitch boiling from about 355° C. to about 450° C.,
   B. from about 2% to about 25% PVC,
   C. from about 2.0% to about 25% of a solid particulate filler, and
   D. from about 5% to about 55% of an additive blend, said additive blend comprising from 15%–30% of an aromatic petroleum-based distillate boiling from about 260° C. to about 535° C., from about 15%–30% of a petroleum-based distillate boiling from about 220° C. to about 650° C., and from about 40% to about 70% of an aromatic petroleum-based distillate boiling from 285° C. to about 395° C.

* * * * *